Figure 1:
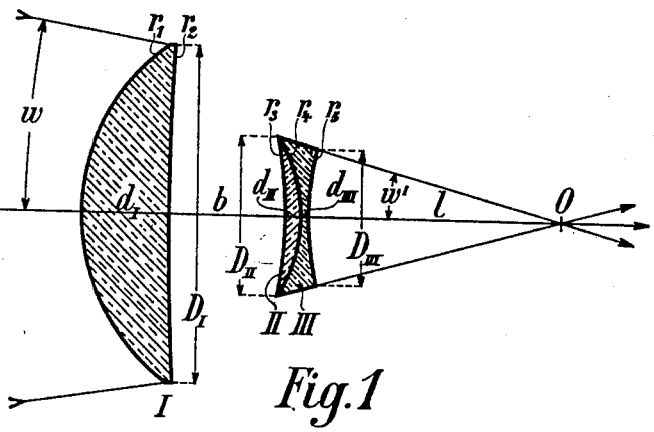

M. VON ROHR.
TELESCOPE SPECTACLE GLASS.
APPLICATION FILED NOV. 22, 1911.

Patented June 4, 1912.

Witnesses:
Paul Krüger
Richard Hahn

Inventor:
Moritz von Rohr

UNITED STATES PATENT OFFICE.

MORITZ von ROHR, OF JENA, GERMANY, ASSIGNOR TO THE FIRM OF CARL ZEISS, OF JENA, GERMANY.

TELESCOPE-SPECTACLE GLASS.

1,028,281.  Specification of Letters Patent.  Patented June 4, 1912.

Application filed November 22, 1911. Serial No. 661,839.

*To all whom it may concern:*

Be it known that I, MORITZ VON ROHR, a citizen of the German Empire, residing at Jena, Germany, have invented a new and useful Telescope-Spectacle Glass, of which the following is a specification.

The subject of the invention is a lens-system for telescope-spectacles (a telescope-spectacle-glass), presenting a very large field of vision and exhibiting, even when objects at the margin of this field are viewed, therefore even for the pencils of greatest inclination, a very small amount of distortion, a moderate chromatic aberration and only traces of astigmatism. Telescope-spectacle-glasses are known, besides from other sources, from the Patent 1000346. They are, along with the Galilean telescopes in a restricted sense, a sub-species of the telescope-system consisting of a collective front member and a dispersive hinder member. The weight of a telescope-spectacle-glass, the distance between its two members and the distance of its center of gravity from the hinder member must be small. Therefore its magnification is at most a twofold one, and its objective is not achromatized, but consists of a single collective lens. By means of the connection of the telescope-spectacle-glass with the user's head the condition, which is the usual starting point in the calculation of spectacle-glasses, is fulfilled in practice, viz. that the center of the diaphragm of the system, the crossing-point of the principal rays, lies in the locus of the center of rotation of the eye, approximately $2\frac{1}{2}$ cm. behind the rear lens surface. For this reason it is possible with the telescope-spectacle-glass to utilize in a perfect manner a very extensive field of vision, presenting a sharp image up to its margin, while an adjustment between the two members for adapting the system to the refractive condition of the eye of the observer is excluded. The fixed distance between the members may be chosen in such a manner, that a telescope-system in the strict sense of the term results. The power of this system is zero, so that it is suitable for an emmetropic eye. The system may, on the other hand, have a moderate negative or positive vertex refraction, so as to be suitable for a myopic or a hypermetropic eye of corresponding axial refraction for the purpose of directly and distinctly seeing distant objects.

In the telescope-spectacle-glass according to the present invention a chromatic correction is attained in the same manner as in the case of the lens-system for Galilean telescopes, described in the German Patent 20729. The chromatic aberration of the single collective front member is partly compensated by the dispersive hinder member, which is cemented together out of a collective lens and a dispersive one. For this purpose there is chosen for the collective lens a glass of a lower refractive index and for the dispersive lens one of a higher relative dispersion. In order to counteract the astigmatism of the inclined pencils and at the same time reduce the distortion to a small amount, the dispersive lens is to be disposed, according to the present invention, as the hinder lens and in a bi-concave form. With this arrangement a particularly extensive correction of astigmatism may then be obtained, if the collective front lens be given a concave front surface, so that the hinder member receives a bi-concave form.

If the eye, which is to be fitted with the new telescope-spectacle-glass having two members, be afflicted with astigmatism, this ocular defect may be corrected by converting one of the free lens surfaces of the system, which latter has been calculated in the ordinary way, from a spherical to a toric one, of the two radii of which one deviates in the direction and amount, requisite for the correction, from that of the former spherical surface. In order to let the axial astigmatism thus introduced appear on all principal rays of finite inclination as well, the rear surface of the system may be made the toric one. To still better attain this object, the rear spherical surface may be further selected in such a manner, that it permits the principal rays to emerge without deflection or with only a slight deflection. That is the case, when its center lies very near the crossing-point of the principal rays, so that its radius keeps between the limits 20 and 35 mm.

Figure 2:
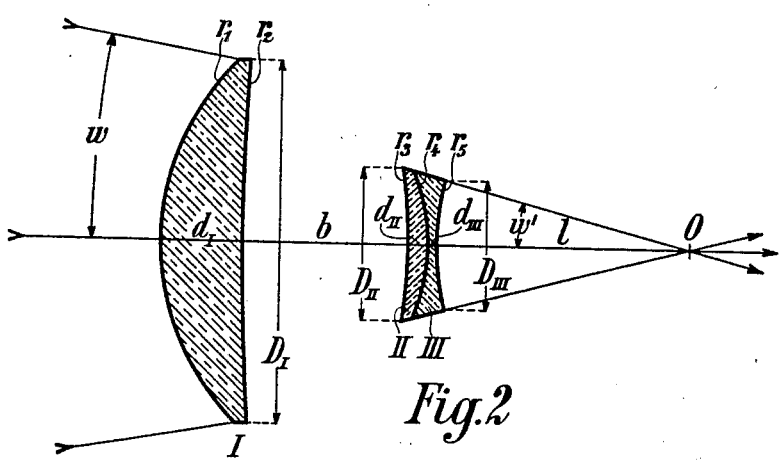
Figure 3:
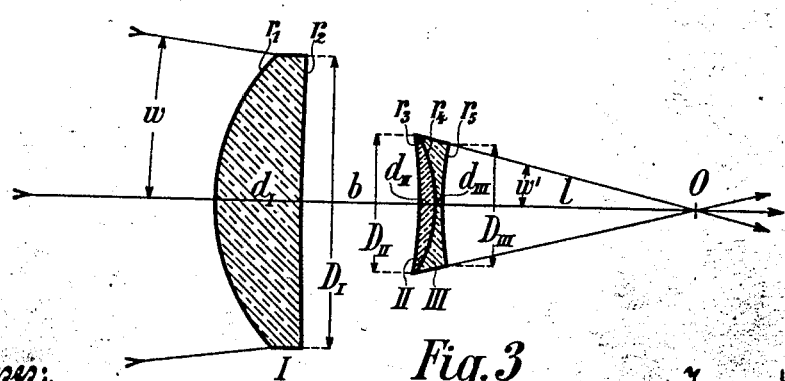

In the annexed drawing: Figure 1 is a constructional form of the spectacle-glass according to the invention, suitable for an emmetropic eye. Fig. 2 is a second form of such a spectacle-glass, suitable for a myopic eye. Fig. 3 is a third form of such a spectacle-glass, suitable for a hypermetropic eye. In all three cases the rear surface of the system realizes the condition last made, while, the eye being assumed to be free from astigmatism, the rear surface is left spherical, as the conversion of this surface into a toric one requires no explanation.

*First example (Fig. 1).*

Telescopic lens-system (for emmetropic eyes). Magnification of the retinal image in the axial direction 1.77. Below are given: the dimensions of the lenses I, II and III, their distances apart and from the crossing-point O of the principal rays, the inclinations $w_{max}$ and $w'_{max}$ of the marginal principal rays on entering and emerging, the kinds of glass and also the remaining portions of astigmatism. These remaining portions are illustrated by the reciprocals measured in dptr. of the intersectional distances $s'_f$ and $s'_t$ on the side nearest the eye of the sagittal and meridional pencils, which pertain to the principal ray coinciding with the axis, to one of intermediate inclination and to a marginal principal ray.

*Dimensions and distances of the lenses in mm.*
$d_I=8.5$; $b=11.8$; $d_{II}=1.5$; $d_{III}=0.5$; $l=25$
$r_1=20.6$; $r_2=250$; $r_3=40.6$; $r_4=15.0$; $r_5=29.3$
$D_I=33.6$; $D_{II}=15.8$; $D_{III}=13.8$

*Inclination of entrance and emergence of the marginal principal rays.*
$w_{max}=8.98°$; $w'_{max}=16°$

*Kinds of glass.*

| | $n_D$ | $\nu$ |
|---|---|---|
| I: | 1.5183 | 60.5 |
| II: | 1.5127 | 57.2 |
| III: | 1.6211 | 36.2 |

*Correction of astigmatism.*

| | $w=0°$ | $6.76°$ | $8.98°$ |
|---|---|---|---|
| $\frac{1}{s'_f}=$ | 0 dptr. | +0.28 dptr. | +0.34 dptr. |
| $\frac{1}{s'_t}=$ | 0 " | +0.59 " | +3.53 " |
| $\frac{1}{s'_t}-\frac{1}{s'_f}=$ | 0 " | +0.31 " | +3.19 " |

*Second example (Fig. 2).*

Lens-system of $-7$ dptr. vertex refraction (for myopic eyes of 6.5 dptr. axial refraction). Magnification of the retinal image 1.80.

*Dimensions and distances of the lenses in mm.*
$d_I=8.0$; $b=16.5$; $d_{II}=1.9$; $d_{III}=0.6$; $l=25$
$r_1=25.5$; $r_2=239$; $r_3=51.7$; $r_4=19.0$; $r_5=26.7$
$D_I=36.3$; $D_{II}=15.2$; $D_{III}=13.0$

*Inclination of entrance and emergence of the marginal principal rays.*
$w_{max}=10.14°$; $w'_{max}=15°$

*Kinds of glass.*
As in the first example.

*Correction of astigmatism.*

| | $w=0°$ | $7.10°$ | $10.14°$ |
|---|---|---|---|
| $\frac{1}{s'_f}=$ | −7.0 dptr. | −7.07 dptr. | −7.29 dptr. |
| $\frac{1}{s'_t}=$ | −7.0 " | −7.09 " | −7.40 " |
| $\frac{1}{s'_t}-\frac{1}{s'_f}=$ | 0 " | −0.02 " | −0.11 " |

*Third example (Fig. 3).*

Lens-system of $+3.44$ dptr. vertex refraction (for hypermetropic eyes of 3.57 dptr. axial refraction). Magnification of the retinal image 1.91.

*Dimensions and distances of the lenses in mm.*
$d_I=8.5$; $b=11.8$; $d_{II}=1.5$; $d_{III}=0.5$; $l=25$
$r_1=21.0$; $r_2=386$; $r_3=43.8$; $r_4=13.9$; $r_5=34.2$
$D_I=29.2$; $D_{II}=13.6$; $D_{III}=12.2$

*Inclination of entrance and emergence of the marginal principal rays.*
$w_{max}=7.30°$; $w'_{max}=14°$

*Kinds of glass.*
As in the first example.

*Correction of astigmatism.*

| | $w=0°$ | $5.09°$ | $7.30°$ |
|---|---|---|---|
| $\frac{1}{s'_f}=$ | +3.44 dptr. | +3.52 dptr. | +3.22 dptr. |
| $\frac{1}{s'_t}=$ | +3.44 " | +3.60 " | +1.38 " |
| $\frac{1}{s'_t}-\frac{1}{s'_f}=$ | 0 " | +0.08 " | −1.84 " |

I claim:

1. Achromatic telescope-spectacle-glass of at the most a twofold magnification, consisting of a single, collective front member and a dispersive hinder member, which latter is cemented together out of a collective lens of a lower refractive index and a dispersive lens of a higher relative dispersion, the dispersive lens being the hinder lens of the hinder member and bi-concave.

2. Achromatic telescope-spectacle-glass of at the most a twofold magnification, consisting of a single, collective front member and a dispersive hinder member, which latter is cemented together out of a collective lens of a lower refractive index and a dispersive lens of a higher relative dispersion, the hinder member being bi-concave and the dispersive lens being the hinder lens of this member and bi-concave.

3. Achromatic telescope-spectacle-glass of at the most a twofold magnification and suitable for an astigmatic eye, consisting of a single, collective front member and a dispersive hinder member, which latter is cemented together out of a collective lens of a lower refractive index and a dispersive lens of a higher relative dispersion, the hinder member being bi-concave, the dispersive lens being the hinder lens of this member and bi-concave, the hinder surface of this hinder member being for the correction of the said astigmatism a toric one and one of the two radii of the toric surface lying between 20 and 35 mm.

MORITZ von ROHR.

Witnesses:
PAUL KRÜGER,
FRITZ SANDER.